G. L. BLANCHARD.
MACHINE FOR MANUFACTURING STRIP SAWS.
APPLICATION FILED JAN. 23, 1915.

1,156,458.

Patented Oct. 12, 1915.
2 SHEETS—SHEET 1.

Witnesses
Edwin J. Beller
N. H. Byrne

Inventor
George L. Blanchard,
by Wilkinson, Guista & Mackay
Attorneys.

G. L. BLANCHARD.
MACHINE FOR MANUFACTURING STRIP SAWS.
APPLICATION FILED JAN. 23, 1915.
1,156,458.
Patented Oct. 12, 1915.
2 SHEETS—SHEET 2.
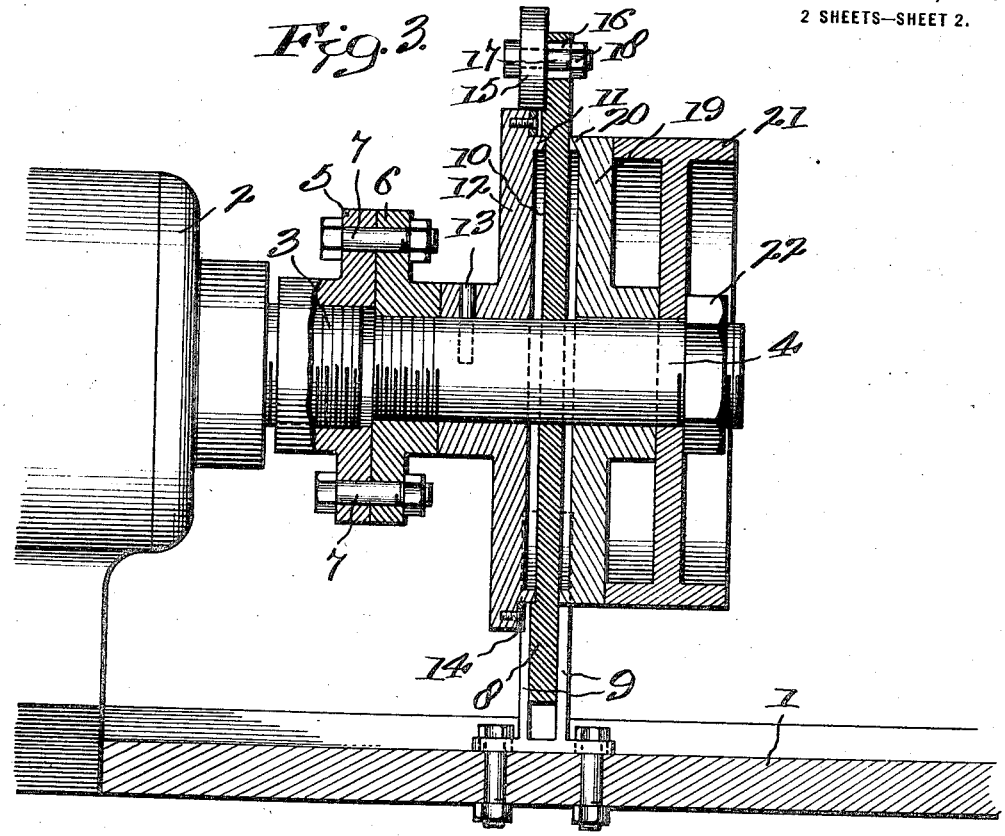
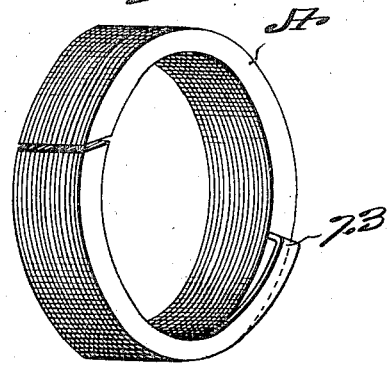
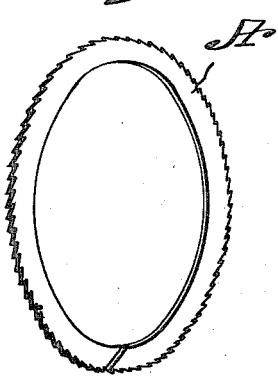
Witnesses
Edwin J Beller.
N. H. Byrne.
Inventor
George L. Blanchard,
By Wilkinson, Fisher & Mackay
Attorneys

UNITED STATES PATENT OFFICE.

GEORGE L. BLANCHARD, OF MONTGOMERY, ALABAMA.

MACHINE FOR MANUFACTURING STRIP-SAWS.

1,156,458.          Specification of Letters Patent.        Patented Oct. 12, 1915.

Application filed January 23, 1915. Serial No. 3,982.

*To all whom it may concern:*

Be it known that I, GEORGE L. BLANCHARD, a citizen of the United States, residing at Montgomery, in the county of Montgomery and State of Alabama, have invented certain new and useful Improvements in Machines for Manufacturing Strip-Saws; and I do hereby declare the following to be a full, clear, and exact description of the invention, such as will enable others skilled in the art to which it appertains to make and use the same.

The present invention relates to machines for forming spiral strips or coils from ribbon or flat metal strips, and has for its object to provide an apparatus for winding such strips on edge without causing the same to buckle or be otherwise deformed; and in such a manner that each convolution of the finished product will be of uniform width and thickness throughout.

The apparatus is intended primarily for the manufacture of strips to be made into saws for the saw cylinders of cotton gins, linters, and delinters, of that type disclosed and more particularly described, in my copending applications for U. S. patents bearing the Serial Numbers 3796 and 3797 and both dated January 22nd 1915; and to this end the machine embodies means adapting the same for working strips of varying temper and thickness to suit the standard conditions required for such saw cylinders.

With these and other objects in view the invention consists in the novel details of construction and combinations of parts more fully hereinafter disclosed and particularly pointed out in the claims.

Figure 1:
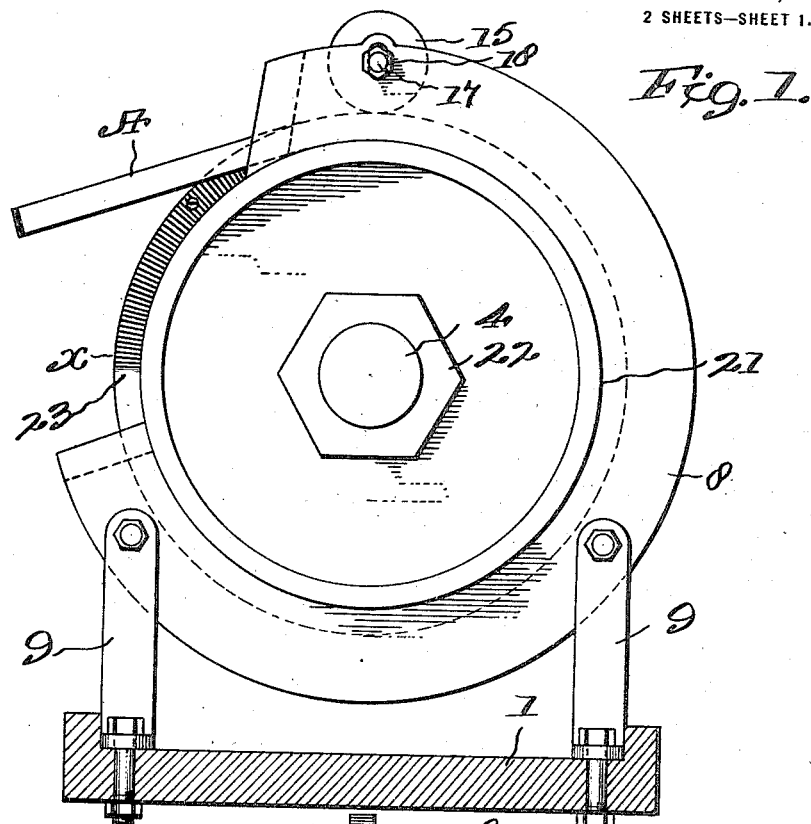
Figure 2:
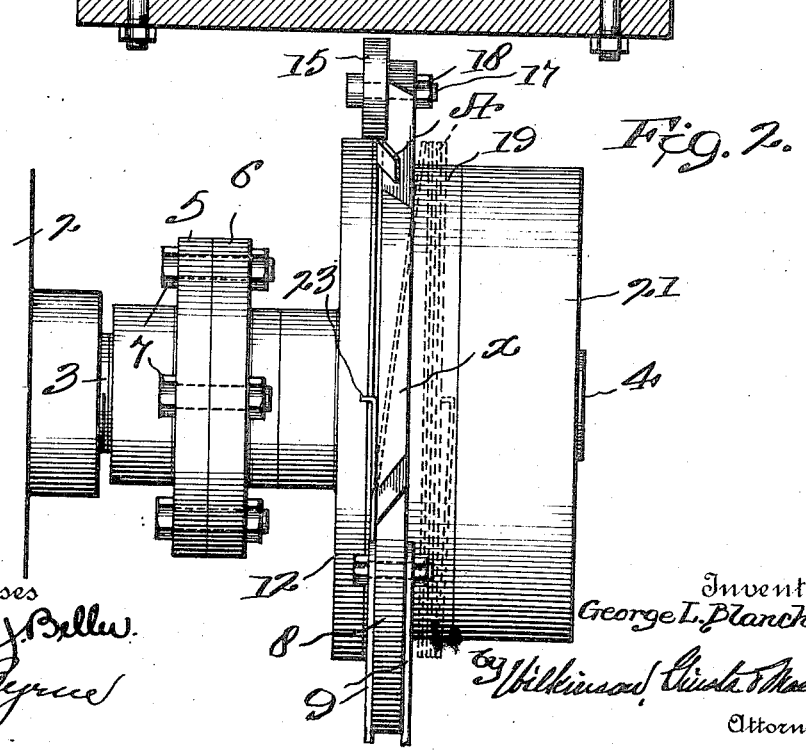

Referring to the accompanying drawings forming a part of this application, and in which similar reference symbols indicate corresponding parts in the several views: Figure 1 is a front elevational view of the machine. Fig. 2 is a side view of the same. Fig. 3 is a longitudinal sectional view of the machine, with parts in elevation. Fig. 4 is a perspective view of the finished product, and showing the same cut for forming the saw rings; and Fig. 5 is a detail view of one of the saws.

Referring to the construction and arrangement of parts in detail, 1 designates the ordinary supporting plate of a lathe, 2, to the shaft 3 of which is coupled the shaft 4 of the machine. Said coupling consists of a pair of flanged nuts 5 and 6, screw-threaded on the adjacent ends of said shafts 3 and 4, and secured together by a plurality of bolts 7.

The spiral or coil forming machine *per se* consists of a stationary head or disk 8, fitting over the shaft 4 and rigidly secured by a pair of straps or brackets 9, having suitable detachable connection with said head and the base plate 1. The head 8 is formed with a recess 10 in one face that receives a mandrel 11, carried by the rotatable head 12, and which mandrel is fixed to rotate with the shaft 4 by a pin 13 or other suitable device.

The mandrel 11, together with the stationary and rotatable heads 8 and 12, provide the annular groove or channel within which is formed convolutions of the spiral, and a steel ring 14 having a knurled face, is carried by the rotatable head to frictionally engage with the forming strip and carry the same around the mandrel. A roller 15 is adjustably mounted at the top of the head 8, and has for its purpose to guide the entering strip within the shaping channel, *i. e.* between the knurled ring 14 and the adjacent surface of the fixed head 8. The purpose of adjustably mounting the guiding roller is to accommodate strips of varying temper, inasmuch as said strips, after coming from the machine, spring out about one-half an inch, and this spring can, to a great degree, be regulated by the pressure of the roller on the entering strip in order to insure the proper diameter (viz. 11¼ inches) to fit the standard saw cylinder. The means for adjusting said roller consists of a slot 16 receiving the pintle 17, and the nut 18 threaded on said pintle.

A thrust head 19 is mounted on and rotates with the shaft 4, and has an axially extended and annular flange 20 bearing against the face of the head 8 immediately opposite the mandrel 11, and said thrust head effectively holds the fixed head 8 against bending or other distortion incident to the shaping of the spiral. A support 21, constructed after the manner of a pulley, is secured to the shaft 4 by the nut 22, and against the thrust head 19 with which it rotates. Said members 19 and 21 rotate in unison and provide an unbroken cylindrical supporting surface that receives the shaped strip, as illustrated in Fig. 2. The stationary head 8, together with the thrust head 19 and support 21, are adapted to be positioned laterally with respect to the rotatable head 12, whereby to regulate the width of the forming channel to the end of accommodating strips of varying width, and for the purpose of regulating said channel to prevent buckling of the steel and force the same into more intimate contact with the knurled ring. The stationary head 8 is cut away, as at X (see Figs. 1 and 2), to form a clearance for carrying the formed strip from the shaping elements to the supporting cylinder, as clearly indicated in broken lines in Fig. 2.

In operation, the end of the strip A is bent at right-angles, as at 23 (see Fig. 2), and inserted in a small opening formed in the knurled ring for that purpose, and after the initial turn of the lathe, the strip will thereafter be fed by the knurled face, binding the same against the surface of the stationary head, and the strip will thereafter be guided by the roller 15, and shaped for its entire length. In the course of formation of the spiral, the strip has its outer edge drawn out and thinned, while the inner edge is consequently buckled and thickened, and this tendency is compensated for by reason of the fixed dimensions in the channel-way, which causes the metal to be evenly distributed and leave the machine at a uniform width. The diameter of the mandrel 11 is 10½ inches, and the diameter of the saw cylinder to which the strip is applied is 11¼ inches, though this discrepancy is compensated for through the tendency of the finished strip to spring outwardly, and the manner of cutting the coil (see Fig. 4) when each saw may be fitted to the cylinder in the manner disclosed in my co-pending applications above referred to.

It is obvious that those skilled in the art may vary the details of construction and arrangement of parts without departing from the spirit of my invention, and therefore I do not wish to be limited to such features except as may be required by the claims.

I claim:—

1. In a machine for forming spiral strips, the combination of a stationary head, a rotatable head, a mandrel and a knurled element associated with said rotatable head and coöperable with the stationary head to form a spiral, and means for guiding a strip between said rotatable and stationary heads, substantially as described.

2. In a machine for forming spiral strips, the combination of a stationary head, a rotatable head, a mandrel carried by said rotatable head and associated with the stationary head, a knurled member carried by the rotatable head for feeding the strip, and means for guiding the strip between said rotatable and stationary heads, substantially as described.

3. In a machine for forming spiral strips, the combination of a stationary head, a rotatable head, a mandrel carried by said rotatable head and associated with the stationary head, a knurled ring carried by the rotatable head and surrounding the mandrel for feeding the strip, and adjustable means for guiding the strip between the knurled ring and the stationary head, substantially as described.

4. In a machine for forming spiral strips, the combination of a stationary head having a recessed face, a rotatable head having a mandrel fitting within said face, a knurled ring carried by the rotatable head and surrounding said mandrel for feeding the strip, and adjustable means for guiding the strip between said knurled ring and the stationary head, substantially as described.

5. In a machine for forming spiral strips, the combination of a stationary head, a rotatable head, a mandrel carried by the rotatable head and associated with the stationary head, a knurled member carried by the rotatable head for feeding the strip, a thrust head engaging said stationary head on the side opposite said rotatable head, and adjustable means for guiding the strip between said knurled member and the stationary head, substantially as described.

6. In a machine for forming spiral strips, the combination of a stationary head having a recessed face, a rotatable head, a mandrel carried by said rotatable head and entering said recess, a knurled ring carried by said rotatable head and surrounding the mandrel to feed the strip, a thrust head engaging said stationary head on the side opposite said mandrel, and a roller adjustably mounted on said stationary head for guiding the strip, substantially as described.

7. In a machine for forming spiral strips, the combination of a stationary head having a recessed face, a rotatable head, a mandrel carried by said rotatable head and entering said recess, a knurled ring carried by said rotatable head and surrounding the mandrel to feed the strip, a thrust head engaging said stationary head on the side opposite said mandrel, an annular member forming said mandrel, an annular member forming a support with said thrust head to receive the formed spiral, and a roller adjustably mounted on said stationary head for guiding the strip, substantially as described.

8. In a machine for forming spiral strips, the combination of a stationary head, a shaft mounted to rotate in said head, a head mounted to rotate with said shaft, a mandrel carried by said rotatable head and associated with the stationary head, a knurled ring carried by said rotatable head and surrounding the mandrel to feed the strip, a rotatable thrust head secured to rotate with said shaft and engaging with the stationary head on the opposite side of said mandrel, a support secured to said shaft adjacent said thrust head and providing therewith a support to receive the finished strip, and a roller adjustably mounted on said stationary head to guide the strip between the knurled ring and the stationary head, substantially as described.

9. In a machine for forming spiral strips, the combination of a stationary and adjustably-mounted head, a shaft rotatable in said head, a head secured to rotate with said shaft, a mandrel carried by said rotatable head and associated with the stationary head, a knurled ring carried by the rotatable head and surrounding said mandrel to feed the strip, a thrust head adjustably mounted on and rotatable with said shaft and engaging with the stationary head on the side opposite said mandrel, and a roller adjustably mounted on said stationary head to guide the strip between the knurled ring and the stationary head, substantially as described.

In testimony whereof, I affix my signature, in presence of two witnesses.

GEORGE L. BLANCHARD.

Witnesses:
H. H. BYRNE,
EDWIN J. BELLER.